United States Patent Office 3,067,863
Patented Dec. 11, 1962

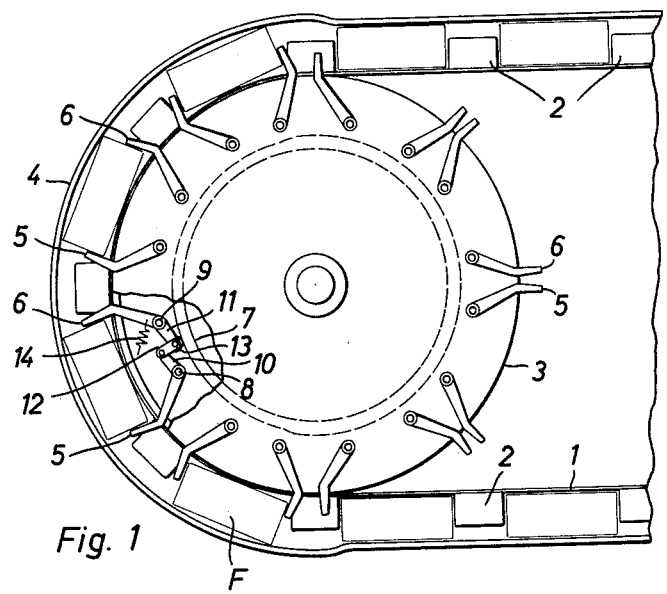
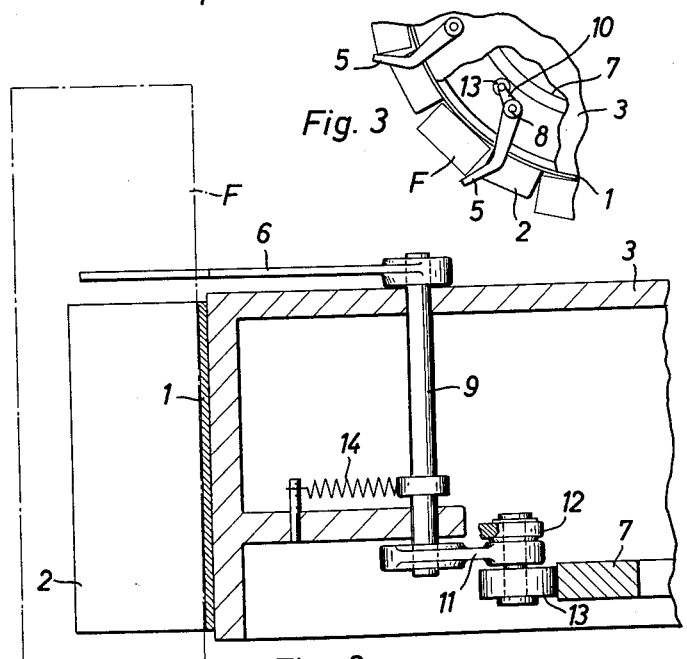

3,067,863
ENDLESS CONVEYOR MECHANISM FOR FOLDING BOXES IN PACKAGING MACHINES
Heinrich Schwinger, Fellbach, Wurttemberg, Germany, assignor to Firma Fr. Hesser Maschinenfabrik-Aktiengesellschaft, Stuttgart-Bad Cannstatt, Germany, a corporation of Germany
Filed Apr. 12, 1960, Ser. No. 21,698
Claims priority, application Germany, Apr. 21, 1959
5 Claims. (Cl. 198—210)

My invention relates to an endless conveyor mechanism for folding boxes in packaging machines, said conveyor traveling around reversing drums or the like.

After having been opened, previously-flattened folding box cases have the tendency, on account of the stresses effective at the edges thereof, to return more or less to the original flattened condition, that is to assume a rhomboidal parallelogram in cross section.

During their transport along a straight stretch of a conveyor mechanism this has no significance because the folding boxes are, over this part of their travel, seated in rectangular areas defined by impelling means of the conveyor, the conveyor belt or the like and outer lateral fixed guide rails, thereby positively confining the boxes to a rectangular cross section. Where, however, the endless conveyor mechanism passes into one of the semi-circular runs at the ends of the conveyor, the impelling means of the mechanism splay apart and allow the folding boxes to deform in the manner referred to above. In addition, the friction against the outer fixed guide rails assists this effect with the result that the folding boxes progressively take up a rhomboidal parallelogram in cross section from the cemented rectangular bottom thereof to the top. This takes place in the case of filling and closing machines in which the discharge takes place at one of the reversing sections of the conveyor, thus, reducing the cross sectional area of the box available for filling, thereby resulting in a loss in charging capacity, so that the folding boxes cannot accommodate the amount of filling material which has been weighed out. Therefore, the filling material overflows from the boxes, which results in underweight packages.

To avoid this disadvantage, the conveyor mechanism in accordance with my invention comprises an endless conveyor carrying longitudinally-spaced, box-impelling elements, at least one reversing member guiding the conveyor in its travel, a plurality of fingers pivoted on said guiding member, said fingers being spaced regularly around said member at a pitch corresponding to the box-accommodating pitch of the conveyor and projecting transversely into the part of the path of travel of the boxes around said guiding member, and a stationary cam cooperating with said fingers to move them against the side walls of the boxes during said part of their travel and urge them into rectangular shape.

Two embodiments of the invention are illustrated, by way of example, in the accompanying drawings, in which:

FIGURE 1 is a top plan view showing a part one embodiment of the conveyor mechanism according to the invention, FIGURE 2 is a cross section through part of the reversing drum shown in FIG. 1, and FIGURE 3 a part of a reversing drum of another embodiment of the invention.

The figures illustrate a semi-circular reversing section of an endless conveyor belt 1 which feeds the folding boxes F by means of a series of impelling elements 2, at a predetermined spacing, to the various operating devices (not shown) of a packaging machine. The reversing section is defined by a drum 3 which rotates about a vertical axis. The conveyor belt 1 and impelling elements 2 are provided with an associated fixed guide rail 4, thereby forming a plurality of rectangular box seating areas in the straight stretch of the conveyor for imparting a rectangular shape to the conveyed boxes F (FIG. 1).

To enable the folding boxes F, as they are moved forward by the impelling elements 2, to retain a rectangular cross section when passing over the reversing section in which these elements 2 are positively directed radially outwards, i.e. gape apart, and thereby form circular segmental conveyor areas in conjunction with the conveyor belt 1 and fixed guide rails 4, a plurality of fingers 5 and 6 are arranged, at pitch distances corresponding to those of the conveyor mechanism, around the margin of the drum 3 and are pivotally mounted at the upper side of this drum.

In the embodiment of the invention illustrated in FIGURES 1 and 2, two fingers 5, 6 are arranged in pincers formation for each sub-division of the drum 3, the fingers having offset ends which project beyond the edge of the drum 3 and are applied against the narrow sides of the folding boxes F. The fingers 5, 6 of each pair are constructed and arranged so that their ends are parallel in the working position and consequently impart the required rectangular cross sectional shape to folding boxes F disposed between them.

To ensure a satisfactory introduction of the folding boxes F between the fingers 5, 6 during the turning of these boxes from the straight section to the semi-circular reversing section of the conveyor mechanism and vice versa, the said fingers are controlled by a stationary cam 7 which is co-axial with the drum 3 and pivots these fingers into the parallel position as the folding boxes move from the straight to the reversing section of the conveyor mechanism and move outwards apart in pincers fashion, as they leave the conveyor belt and the latter moves away from the drum 3.

For this purpose, the fingers 5, 6 are secured to spindles 8, 9 which are rotatably mounted in the drum 3. At their lower ends, the spindles 8, 9 carry levers 10, 11 which are pivotally coupled together by means of a link 12. In addition, the lever 11 on the spindle 9 carries a roller 13 which bears against the edge cam 7 under the tension of a spring 14. The operation of the fingers 5, 6 is such that, depending on the radius of the part of the cam 7 effective at the time, the fingers 5, 6 are splayed apart or are moved towards one another to shape the folding boxes F.

In many cases, particularly where small folding boxes are concerned, it is enough to use, as shown in FIGURE 3, a single finger 5 only instead of each pair of fingers. In this case, the single finger 5 is arranged to be applied against the rear narrow side of the folding box F, as viewed in the direction of transport. The finger 5 is secured to a spindle 8 which is rotatably mounted in the drum 3 and carries at its lower end a lever 10. Lever 10 carries a roller 13 which bears against the stationary cam 7 under the tension of a spring not shown. In this event, the counter holding effect is supplied by the inner rear edge of the impelling element 2 which is located next in front of the folding box F, as seen in the direction of transport.

What I claim is:
1. An endless conveyor mechanism for moving folding boxes and maintaining them in rectangular fillable condition in packaging machines having a straight stretch and a substantially semi-circular run at the end of the straight stretch, said mechanism comprising a conveyor belt, outer lateral fixed guide rails, box impelling members longitudinally spaced along said conveyor belt, the conveyor belt, guide rails and box impelling members forming a plurality of rectangular box seating areas in the straight stretch of the conveyor for imparting a rectangular shape to the conveyed boxes, a drum rotatable about a vertical axis defining the inner curve of the substantially semi-circular run of the mechanism, and fingers pivoted upon said drum adapted to engage ends of the boxes and hold the boxes in rectangular fillable condition while passing around the semi-circular run at the end of the straight stretch of said mechanism.

2. An endless conveyor mechanism for moving folding boxes and maintaining them in rectangular fillable condition in packaging machines having a straight stretch and a substantially semi-circular run at the end of the straight stretch, said mechanism comprising a conveyor belt, outer lateral fixed guide rails, box impelling members longitudinally spaced along said conveyor belt, the conveyor belt, guide rails and box impelling members forming a plurality of rectangular box seating areas in the straight stretch of the conveyor for imparting a rectangular shape to the conveyed boxes, a drum defining the inner curve of the substantially semi-circular run of the mechanism, said drum being rotatable about a vertical axis, in combination with fingers pivoted to said drum each adapted to engage an end of a box and exert pressure thereon while the boxes pass around the substantially semi-circular run of the mechanism, and a cam coaxial with the drum and stationary relative thereto, said cam being operatively connected to the fingers for pivoting said fingers into box-engaging position as the folding boxes move from the straight stretch to the substantially semi-circular run of the mechanism, whereby as said box impelling members are splayed apart while passing around the substantially semi-circular run of the mechanism, said fingers apply pressure upon the boxes and prevent them from returning toward flattened position.

3. A conveyor as claimed in claim 2, in which the fingers are mounted in pairs in said drum, the stationary cam cooperating with the fingers to move the fingers of each pair, in their operative position, substantially parallel to each other, against the leading and rear ends of the folding box.

4. A conveyor as claimed in claim 2, in which single fingers are mounted in the drum, the stationary cam cooperating with each finger to move it, in its operative position, against the rear end of the folding box so as to apply the leading end of the box to the rear end of the impelling element located next in front of the box.

5. An endless conveyor mechanism for moving folding boxes and maintaining them in rectangular fillable condition in packaging machines having a straight stretch and a substantially semi-circular run at the end of the straight stretch, said mechanism comprising a conveyor belt, outer lateral fixed guide rails, box impelling members longitudinally spaced along said conveyor belt, the conveyor belt, guide rails and box impelling members forming a plurality of rectangular box seating areas in the straight stretch of the conveyor for imparting a rectangular shape to the conveyed boxes, a drum defining the inner curve of the substantially semi-circular run of the mechanism, said drum being rotatable about a vertical axis, in combination with pairs of divergent fingers pivoted to said drum adapted to engage the front and rear ends of the boxes while passing around the substantially semi-circular run of the mechanism, and a cam coaxial with the drum and stationary relative thereto, said cam being operatively connected to the fingers for pivoting said pairs of fingers into parallel position relative to each other as the folding boxes move from the straight stretch to the substantially semi-circular run of the mechanism, whereby as said box impelling members are splayed apart while passing around the substantially semi-circular run of the mechanism, said pairs of fingers move the boxes around the semi-circular run and prevent the boxes from returning toward flattened position.

References Cited in the file of this patent

UNITED STATES PATENTS

| 2,112,119 | Rowe | Mar. 22, 1938 |
| 2,584,157 | Pechy | Feb. 5, 1952 |

FOREIGN PATENTS

| 354,530 | Great Britain | Aug. 13, 1931 |